US008996600B1

(12) United States Patent
Langhammer (10) Patent No.: US 8,996,600 B1
(45) Date of Patent: Mar. 31, 2015

(54) SPECIALIZED PROCESSING BLOCK FOR IMPLEMENTING FLOATING-POINT MULTIPLIER WITH SUBNORMAL OPERATION SUPPORT (75) Inventor: Martin Langhammer, Alderbury (GB)

(73) Assignee: Altera Corporation, San Jose, CA (US)

(*) Notice: Subject to any disclaimer, the term of this patent is extended or adjusted under 35 U.S.C. 154(b) by 365 days.

(21) Appl. No.: 13/566,256

(22) Filed: Aug. 3, 2012

(51) Int. Cl.
G06F 7/487 (2006.01)
G06F 7/485 (2006.01)

(52) U.S. Cl.
CPC ...................... G06F 7/485 (2013.01)
USPC ........................................... 708/503

(58) Field of Classification Search
None
See application file for complete search history.

(56) References Cited

U.S. PATENT DOCUMENTS

| | | |
|---|---|---|
| 3,473,160 A | 10/1969 | Wahlstrom |
| 3,697,734 A | 10/1972 | Booth et al. |
| 3,800,130 A | 3/1974 | Martinson et al. |
| 3,814,924 A | 6/1974 | Tate |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barban |
| 4,754,421 A | 6/1988 | Bosshart |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Fujioka, Y., et al., "240MOPS Reconfigurable Parallel VLSI Processor for Robot Control," *Proceedings of the 1992 International Conference on Industrial Electronics, Control, Instrumentation, and Automation: Signal Processing and Systems Control; Intelligent Sensors and Instrumentation*, vol. 3, pp. 1385-1390, Nov. 9-13, 1992.

(Continued)

*Primary Examiner* — David H Malzahn
(74) *Attorney, Agent, or Firm* — Ropes & Gray LLP; Jeffrey H. Ingerman (57) ABSTRACT The functions available in a specialized processing block of a programmable device include floating-point operations, including support within the specialized processing block for subnormal operations. This is accomplished, in part, by borrowing an adder in the specialized processing block and using the adder to operate on output of a multiplier or other operator to compete a subnormal operation. Although the adder becomes unavailable to serve as an adder, the need to complete the operation in slower, more valuable general purpose logic is avoided. The adder and the other operator need not necessarily be located together in a specialized processing block.

19 Claims, 5 Drawing Sheets

(56) References Cited

U.S. PATENT DOCUMENTS

| | | |
|---|---|---|
| 4,791,590 A | 12/1988 | Ku et al. |
| 4,799,004 A | 1/1989 | Mori |
| 4,823,260 A | 4/1989 | Imel et al. |
| 4,823,295 A | 4/1989 | Mader |
| 4,839,847 A | 6/1989 | Laprade |
| 4,871,930 A | 10/1989 | Wong et al. |
| 4,893,268 A | 1/1990 | Denman et al. |
| 4,908,788 A | 3/1990 | Fujiyama |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,373,461 A | 12/1994 | Bearden et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim et al. |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |

(56) References Cited

U.S. PATENT DOCUMENTS

| | | |
|---|---|---|
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,108,772 A | 8/2000 | Sharangpani |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,806,733 B1 | 10/2004 | Pan et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,915,322 B2 | 7/2005 | Hong |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,230,451 B1 | 6/2007 | Langhammer |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,650,374 B1 | 1/2010 | Gura et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,814,136 B1 | 10/2010 | Verma et al. |
| 7,814,137 B1 | 10/2010 | Mauer |
| 7,822,799 B1 | 10/2010 | Langhammer et al. |
| 7,836,117 B1 | 11/2010 | Langhammer et al. |
| 7,865,541 B1 | 1/2011 | Langhammer |
| 7,917,567 B1 | 3/2011 | Mason et al. |
| 7,930,335 B2 | 4/2011 | Gura et al. |
| 7,930,336 B2 | 4/2011 | Langhammer |
| 7,949,699 B1 | 5/2011 | Neoh et al. |
| 8,024,394 B2 | 9/2011 | Prokopenko et al. |
| 8,041,759 B1 | 10/2011 | Langhammer et al. |
| 8,447,800 B2 * | 5/2013 | Dockser et al. ............... 708/501 |
| 8,751,551 B2 | 6/2014 | Streicher et al. |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2002/0143841 A1 | 10/2002 | Farooqui et al. |
| 2003/0065699 A1 | 4/2003 | Burns |
| 2003/0088757 A1 | 5/2003 | Lindner et al. |
| 2004/0064770 A1 | 4/2004 | Xin |
| 2004/0083412 A1 | 4/2004 | Corbin et al. |

(56) References Cited

U.S. PATENT DOCUMENTS

| | | |
|---|---|---|
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0120122 A1 | 6/2005 | Farnham |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2007/0083585 A1 | 4/2007 | St. Denis et al. |
| 2007/0185951 A1 | 8/2007 | Lee et al. |
| 2007/0185952 A1 | 8/2007 | Langhammer et al. |
| 2007/0226287 A1 | 9/2007 | Lin et al. |
| 2007/0241773 A1 | 10/2007 | Hutchings et al. |
| 2008/0133627 A1 | 6/2008 | Langhammer et al. |
| 2008/0183783 A1 | 7/2008 | Tubbs |
| 2009/0028455 A1 | 1/2009 | Nakamura et al. |
| 2009/0172052 A1 | 7/2009 | DeLaquil et al. |
| 2009/0182795 A1 | 7/2009 | Dobbek et al. |
| 2009/0187615 A1 | 7/2009 | Abe et al. |
| 2009/0292750 A1 | 11/2009 | Reyzin et al. |
| 2009/0300088 A1 | 12/2009 | Michaels et al. |
| 2009/0300323 A1 | 12/2009 | Hessel et al. |
| 2010/0098189 A1 | 4/2010 | Oketani |
| 2011/0106868 A1* | 5/2011 | Lutz ............................ 708/207 |
| 2011/0137970 A1* | 6/2011 | Dockser et al. ............... 708/501 |
| 2011/0161389 A1 | 6/2011 | Langhammer et al. |
| 2011/0219052 A1 | 9/2011 | Langhammer |
| 2011/0238720 A1 | 9/2011 | Langhammer |
| 2011/0320513 A1 | 12/2011 | Langhammer |
| 2012/0054254 A1 | 3/2012 | Langhammer |
| 2012/0054256 A1 | 3/2012 | Langhammer |
| 2013/0138711 A1 | 5/2013 | Sugisawa |
| 2014/0067895 A1* | 3/2014 | Wang ............................ 708/501 |
| 2014/0089371 A1* | 3/2014 | Dupont De Dinechin et al. ............................ 708/503 |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO2005/066832 | 7/2005 |
| WO | WO2005/101190 | 10/2005 |
| WO | WO2010/102007 | 9/2010 |

OTHER PUBLICATIONS

Altera Corporation, "Statix II Device Handbook, Chapter 6—DSP Blocks in Stratix II Devices," v1.1, Jul. 2004.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices" *Stratix II Device Handbook*, vol. 2, Chapter 6, v4.0 (Oct. 2005).

Altera Corporation, "FIR Compiler: MegaCore® Function User Guide," version 3.3.0, rev. 1, pp. 3 11 through 3 15 (Oct. 2005).

Altera Corporation, "Advanced Synthesis Cookbook: A Design Guide for Stratix II, Stratix III and Stratix IV Devices," Document Version 3.0, 112 pgs., May 2008.

Amos, D., "PLD architectures match DSP algorithms," *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings* (*Lecture Notes in Computer Science vol. 1896*), Aug. 27-30, 2000, pp. 456-461.

Aoki, T., "Signed-weight arithmetic and its application to a field-programmable digital filter architecture," *IEICE Transactions on Electronics*, 1999, vol. E82C, No. 9, Sep. 1999, pp. 1687-1698.

Ashour, M.A., et al., "An FPGA implementation guide for some different types of serial-parallel multiplier-structures," *Microelectronics Journal*, vol. 31, No. 3, 2000, pp. 161-168.

Berg, B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, P., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing* vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

deDinechin, F. et al., "Large multipliers with less DSP blocks," retrieved from http://hal-ens-lyon.archives-ouvertes.fr/ensl-00356421/en/, 9 pgs., 2009.

(56) References Cited

OTHER PUBLICATIONS

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.

Farooqui, A., et al., "General Data-Path Organization of a MAC unit for VLSI Implementation of DSP Processors," ISCAS '98, Part 2, May 31, 1998-Jun. 3, 1998, pp. 260-263.

Gaffer, A.A., et al., "Floating-Point Bitwidth Analysis via Automatic Differentiation," IEEE *Conference on Field Programmable Technology*, Hong Kong, Dec. 2002.

Govindu, G. et al., "A Library of Parameterizable Floating-Point Cores for FPGAs and Their Application to Scientific Computing," *Proc Int'l Conf. Eng. Reconfigurable Systems and Algorithms (ERSA '05)*, Jun. 2005.

Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems, " *Keynote Address, 5th Canadian Conference on Field Programmable Devices*, Jun. 1998, http:--www.ee.washington.edu-people-faculty-hauck-publications-ReconfigFuture.PDF.

Haynes, S.D., et al., "Configurable multiplier blocks for embedding in FPGAs," *Electronicas Letters*, vol. 34, No. 7, pp. 638-639 (Apr. 2, 1998).

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science vol. 1896)*, Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp *ORCA® FPGA Express™ Interface Manual: ispLEVER® Version 3.0*, 2002.

Lucent Technologies, Microelectronics Group, "Implementing and Optimizing Multipliers in ORCA™ FPGAs,", Application Note. AP97-008FGPA, Feb. 1997.

"Implementing Multipliers in Flex 10K EABs", *Altera*, Mar. 1996.

"Implementing Logic with the Embedded Array in Flex 10K Devices", *Altera*, May 2001, ver. 2.1.

Jinghua Li, "Design a pocket multi-bit multiplier in FPGA " *1996 2nd International Conference on ASIC Proceedings* (IEEE Cat. No. 96TH8140) Oct. 21-24, 1996, pp. 275-279.

Jones, G., "Field-programmable digital signal conditioning " *Electronic Product Design*, vol. 21, No. 6, Jun. 2000, pp. C36-38.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

Kramberger, I., "DSP acceleration using a reconfigurable FPGA," *ISIE '99. Proceedings of the IEEE International Symposium on Industrial Electronics* (Cat. No. 99TH8465), vol. 3 , Jul. 12-16, 1999, pp. 1522-1525.

Langhammer, M., "How to implement DSP in programmable logic " *Elettronica Oggi* No. 266 , Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Martinson, L. et al., "Digital matched Filtering with Pipelined Floating Point Fast Fourier Transforms (FFT's)" *IEEE Transactions on Acoustics, Speech, and Signal Processing* vol. ASSP-23, No. 2, pp. 222-234, Apr. 1975.

Miller, N.L., et al., "Reconfigurable integrated circuit for high performance computer arithmetic," *Proceedings of the 1998 IEE Colloquium on Evolvable Hardware Systems (Digest)* No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Nozal, L., et al., "A new vision system: programmable logic devices and digital signal processor architecture (PLD+DSP)," *Proceedings IECON '91. 1991 International Conference on Industrial Electronics, Control and Instrumentation (Cat. No. 91CH2976-9)*, vol. 3, Oct. 28-Nov. 1, 1991, pp. 2014-2018.

Osana, Y., et al., "Hardware-resource Utilization Analysis on an FPGA-Based Biochemical Simulator ReCSiP" *The Institute of Electronics Information and Communication Technical Report CPSY2005-63*, vol. 105, No. 516, Jan. 18, 2006.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404),Sep. 10-13, 2000, pp. 135-138.

Parhami, B., "Configurable arithmetic arrays with data-driven control " *34th Asilomar Conference on Signals, Systems and Computers* vol. 1, 2000, pp. 89-93.

"The QuickDSP Design Guide", Quicklogic, Aug. 2001, revision B.

"QuickDSP™ Family Data Sheer", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL '99, Proceedings (Lecture Notes in Computer Science vol. 1673)*, Lysaght, P., et al., eds., Aug. 30-Sep. 1, 1999, pp. 264-273.

Tralka, C., "Symbiosis of DSP and PLD," *Elektronik*, vol. 49, No. 14 , Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

(56) References Cited

OTHER PUBLICATIONS

Valls, J., et al., "A Study About FPGA-Based Digital Filters," *Signal Processing Systems*, 1998, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Vladimirova, T. et al., "Floating-Point Mathematical Co-Processor for a Single-Chip On-Board Computer," *MAPLD '03 Conference*, D5 Sep. 2003.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide,"v 1.2, Feb. 4, 2005.

Xilinx Inc., "Complex Multiplier v2.0", DS291 Product Specification/Datasheet, Nov. 2004.

Zhou, G. et al., "Efficient and High-Throughput Implementations of AES-GCM on FPGAs," *International Conference on Field-Programmable Technology*, 8 pgs., Dec. 2007.

Xilinx, Inc., "Implementing Barrel Shifters Using Multipliers," p. 1-4, Aug. 17, 2004.

\* cited by examiner

*PRIOR ART*

SPECIALIZED PROCESSING BLOCK FOR IMPLEMENTING FLOATING-POINT MULTIPLIER WITH SUBNORMAL OPERATION SUPPORT

FIELD OF THE INVENTION

This invention relates to a programmable integrated circuit device, and particularly to a specialized processing block in a programmable integrated circuit device.

BACKGROUND OF THE INVENTION

Considering a programmable logic device (PLD) as one example of an integrated circuit device, as applications for which PLDs are used increase in complexity, it has become more common to design PLDs to include specialized processing blocks in addition to blocks of generic programmable logic resources. Such specialized processing blocks may include a concentration of circuitry on a PLD that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on PLDs is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., as part of the STRATIX® and ARRIA® families include DSP blocks, each of which includes a plurality of multipliers. Each of those DSP blocks also includes adders and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, the user would construct them outside the specialized processing block using general-purpose programmable logic of the device, or using a combination of the fixed-point operators inside the specialized processing block with additional logic in the general-purpose programmable logic.

The IEEE754 standard governs implementation of floating-point arithmetic. According to the that standard as originally promulgated (IEEE754-1985), and taking single-precision format as an example, the mantissa of a single-precision floating-point number should be represented in normalized form (i.e., 1.XXXX . . . ), and can have an exponent between −126 and +127. A later extension of the standard (IEEE754-2008) also provides the option for representing numbers smaller than $1.0 \times 2^{-126}$. If the option for such "subnormal" numbers is exercised in a programmable integrated circuit device having specialized processing blocks, the extra circuitry needed to perform operations involving subnormal numbers has heretofore been implemented outside the specialized processing block using general-purpose programmable logic of the device.

SUMMARY OF THE INVENTION

In accordance with embodiments of the present invention, specialized processing blocks such as the DSP blocks described above may be enhanced by including floating-point operations among the functions available in the DSP block, with support within the specialized processing block for operations involving subnormal numbers. This is accomplished, in part, by borrowing an adder in the specialized processing block and using the adder to operate on output of a multiplier to compete a subnormal multiplication operation. Although the adder becomes unavailable to serve as an adder, the need to complete the operation outside the specialized processing block in slower, more valuable general purpose logic is avoided.

Therefore, in accordance with embodiments of the present invention there is provided circuitry for operating on floating-point numbers, each of the floating-point numbers having a mantissa and an exponent. The circuitry includes at least one operator having an operator output, and an adder having the operator output as an input. When an operation performed by the operator is a subnormal operation, the adder operates on the operator output to complete the subnormal operation.

A method of operating such circuitry in a programmable integrated circuit device is also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

A specialized processing block—particularly a DSP block—in accordance with embodiments of the present invention, supports operations involving subnormal numbers by using the post-multiplier adder to handle subnormal support functions that would otherwise have to be handled outside the specialized processing block. Use of the adder for that subnormal support is a user-configurable option, and if the option is not selected by the user, the adder may be used as an adder as previously known. Although the addition function of the adder is lost from that particular specialized processing block when it is used for subnormal support, it is an acceptable trade-off in that it eliminates the need to use valuable, and slower, general-purpose programmable logic outside the specialized processing block for the subnormal support functions.

Although the discussion above, and that follows, is written in terms of a specialized processing block including at least one multiplier and an adder, the invention can be implemented in a block having other types of floating-point operators along with an adder to complete the subnormal operation. For example, in a block with multiple adders, one adder could be used to complete subnormal addition in another adder. Moreover, the adder used to complete the subnormal operation of another operator need not necessarily be within the same specialized processing block as the operator; as long as signals from the operator can be routed to the adder, the use of general-purpose programmable logic may be avoided.

The discussion that follows is written in terms of the IEEE754 standard for implementing floating-point operations in electronic devices. However, the present invention is not limited to any particular floating-point number representation scheme.

The IEEE754 standard governs the implementation of floating-point arithmetic operations in electronic devices. That standard defines, e.g., a single-precision number as a 32-bit value, including one sign bit, eight bits representing the exponent, and a 23 bit mantissa. The mantissa is assumed to be normalized (1.XXXX . . . ), so the leading '1' is assumed and the 23 bits in are the fractional bits (this gains an extra bit's worth of precision). The value in the exponent field has a bias of +127, and a valid range of 1 to 254, which corresponds to an actual exponent of −126 to +127. A single-precision number (there are also double-precision and higher precision numbers) having the value 'sign' in the sign field, the value 'exponent' in the exponent field, and the value 'mantissa' in the mantissa field therefore represents the number $$(-1)^{'sign'} \times (1 \cdot \text{'mantissa'}) \times 2^{('exponent'-127)}.$$

A subnormal number, also known as a denormal number or a denormalized number, or as a gradual underflow, is a number that is smaller than the smallest number that can be represented using a legal exponent and a normalized mantissa. If a number is not assumed to be normalized, and a leading '1' is not implied, then for each '0' in the more significant bit positions in the mantissa, the effective exponent is decreased by 1. For example, $0.111. \times 2^{-126} = 1.11 \times 2^{-127}$, while $0.00001 \times 2^{-126} = 1 \times 2^{-131}$. With a 24-bit mantissa (including the implied position), one can have 23 leading zeroes without a complete loss of precision, meaning that the smallest subnormal number that can represented under the IEEE754 standard is $1 \times 2^{-126-23} = 1 \times 2^{-149}$. Taking a complete single-precision IEEE754 number as an example, if the number (in binary) is $$00000000000000001011101111111010,$$

then the sign bit is '0', the exponent is '00000000', and the mantissa is '00000001011101111111010'. As discussed above, normally the smallest legal exponent value is 1, and if that were the exponent here, this number would be $$+1 \times 1.00000001011101111111010 \times 2^{-126}.$$

Similarly, as also noted above, with a '0' exponent, a '0' mantissa would signify a value of '0'. However, the IEEE754 standard also provides for subnormal number with a '0' exponent and a nonzero mantissa, as here, meaning that there is no implied leading '1', and the mantissa is multiplied by $2^{-126}$. Thus, the example above, where the first non-zero bit beyond the binal point is the eighth bit, is equal to $$+1 \times 0.00000001011101111111010 \times 2^{-126} =$$
$$1.01110111111010 \times 2^{-126-8} =$$
$$1.01110111111010 \times 2^{-134}.$$

There are several ways that a subnormal result can be obtained from a single-precision multiplication operation. The product of two subnormal numbers will always be '0' (because it will necessarily be smaller than the smallest number that can be represented). However, depending on the particular input values, the product of two normalized numbers, and the product of a normalized number and a subnormal number, may be either normalized or subnormal.

In accordance with implementations of the invention, when configured for use along with an adder for subnormal operations, the multiplier (or other initial operator) will inspect the resulting exponent and mantissa of its output and generate special control signals for the adder, as follows.

A multiplication operation with normalized multiplicands will take the form:

$$((-1)^{'signone'} \times (1 \cdot \text{'mantissaone'}) \times 2^{('exponentone'-127)}) \times$$
$$((-1)^{'signtwo'} \times (1 \cdot \text{'mantissatwo'}) \times$$
$$2^{('exponenttwo'-127)}) = ((-1)^{'signone'+'signtwo'} \times$$
$$(1 \cdot \text{'mantissaone'}) \times (1 \cdot \text{'mantissatwo'}) \times$$
$$2^{('exponentone'+'exponenttwo'-254)})$$

Because the mantissas, each including the leading '1', are two numbers between 1 and 2-δ, the mantissa of the product (<mantissa>) will be either 01.XXX . . . XXX, or 10.XXX . . . XXX or 11.XXX . . . XXX—i.e., a number between 1 and 4-δ. This leads to two possibilities for a subnormal result based on the exponents (where 'exponentone'+'exponenttwo'−254='exponent').

In Case 1:
'exponent'≤0 and 1.0≤'mantissa'<2.0,
in which case the following special control signals are generated in accordance with implementations of the current invention for use by a subsequent adder:
Set special_underflow flag=0.
Set special_negative_exponent flag=1.
Set special_underflow_sticky flag=sticky bit OR adder [23], where adder[23] is the 23rd bit of a final adder (e.g., a carry-propagate adder) within the multiplier.
Set 'exponent'='exponent'.
In Case 2:
'exponent'<0 and 'mantissa'≥2.0,
in which case the following variables are set in accordance with implementations of the current invention for use by the subsequent adder:
Set special_underflow flag=0.
Set special_negative_exponent flag=1.
Set special_underflow_sticky flag=sticky bit OR adder[23] OR adder[24], where adder[23] and adder[24] are defined as above.
Set 'exponent'='exponent'+1.

In both Case 1 and Case 2, setting the underflow flag to '0' tells the adder that there is no underflow, meaning that there is an implied leading '1'. (Setting the underflow flag to '1' tells the adder that there is an underflow, meaning that there is no implied leading '1', and a '0' should be inserted in that place instead.) But the number is nevertheless subnormal because of the negative exponent, and the result is right-shifted by 1−'exponent' (note that the amount of right-shift—1−'exponent'—increases as the exponent becomes more negative).

Where one multiplicand is normalized and one is subnormal, the mantissa of the product ('mantissa') will be a number between 0+δ and 2−δ. If 'mantissa' is greater than 1, and the 'exponent' is greater than 1, the result is a normalized number and does not require special handling (Set special_underflow flag=0; set special_negative_exponent flag=0). If 'mantissa' is greater than 1, and 'exponent' is less than 1, that is the same as Case 1, above. Three other possible cases remain:

In Case 3:
'exponent'=0 and 'mantissa'<1.0:
Set special_underflow flag=1.
Set special_negative_exponent flag=1.
Set special_underflow_sticky flag=sticky bit OR adder [23], where adder[23] is defined as above.
Set exponent=0.
In subsequent adder, there is not shifting.

In Case 4:
'exponent'<0 and 'mantissa'<1.0:
Set special_underflow flag=1.
Set special_negative_exponent flag=1.
Set special_underflow_sticky flag=stickybit OR adder [23].
Set 'exponent'='exponent'.
In subsequent adder, shift right by '-exponent'.

In Case 5:
'exponent'>0 and 'mantissa'<1.0:
Set special_underflow flag=1.
Set special_negative_exponent flag=0.
Set special_underflow_sticky flag=stickybit OR adder [23], where adder[23] is defined as above.
Set 'exponent'='exponent'.
In addition, in this case, the number of leading zeroes (including the implied position before the binal point) is counted, and:
If leading zeros≥'exponent', shift left by 'exponent'−1. The left-shift is one less than the number of leading zeroes because the subnormal number will always have what becomes its leading '1' somewhere in the mantissa.

Cases 3 and 4 are subnormal because they have both underflow and a negative exponent. Case 5 may be subnormal because it has a mantissa underflow, depending on the value of the exponent.

These additional signals or variables—special_underflow flag, special_negative_exponent flag and special_underflow_sticky flag—are not provided by the IEEE754 standard. However, handling of these variables, as well as information regarding leading zeroes, sticky bits and partial sticky bits, should provide results that are supported by the IEEE754 standard.

Figure 1:
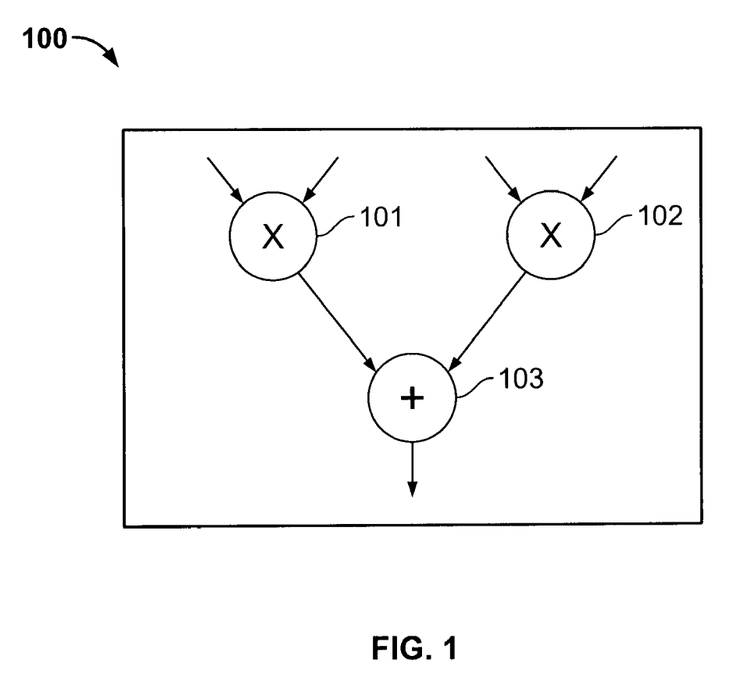
FIG. 1 shows a logical diagram of a multiplier structure of an exemplary specialized processing block with which embodiments of the invention can be used.

FIG. 1 shows a simplified diagram of a specialized processing block 100 of a programmable integrated circuit device such as the STRATIX® or ARRIA® PLDs discussed above. Such a specialized processing block 100 includes two multipliers 101, 102 feeding an adder 103. Although additional circuitry (not shown) is provided, allowing, e.g., various ones of components 101, 102, 103 to be bypassed (or not), or allowing intermediate or final results to be registered (or not), or allowing adder 103 to be used as an accumulator, up to now to support the additional variables described above that are needed for subnormal operation handling, general purpose programmable logic outside specialized processing block 100 had to be used.

In accordance with embodiments of the present invention, modifications can be made to adder 103 to allow support, inside the specialized processing block, of the additional variables, and the passing of information, described above, as needed for subnormal operation handling, without resorting to expensive general-purpose programmable logic outside the specialized processing block. In order to understand those modifications, it is useful to first describe the structure 200 of adder 103, as shown in FIG. 2.

Structure 200 is a simplified adder, modifications to which will be described below to implement embodiments of the invention. However, embodiments of the invention can be implemented by modifying many different types and architectures of floating point adders and are not limited to modifications of the simple example in FIG. 2. In practice, more complex adders could also be modified in accordance with the invention—e.g., for higher performance or other reasons. Examples of other adder architecture include dual path adders, and in other cases the rounding (see below) can be combined with the fixed point addition.

Figure 2:
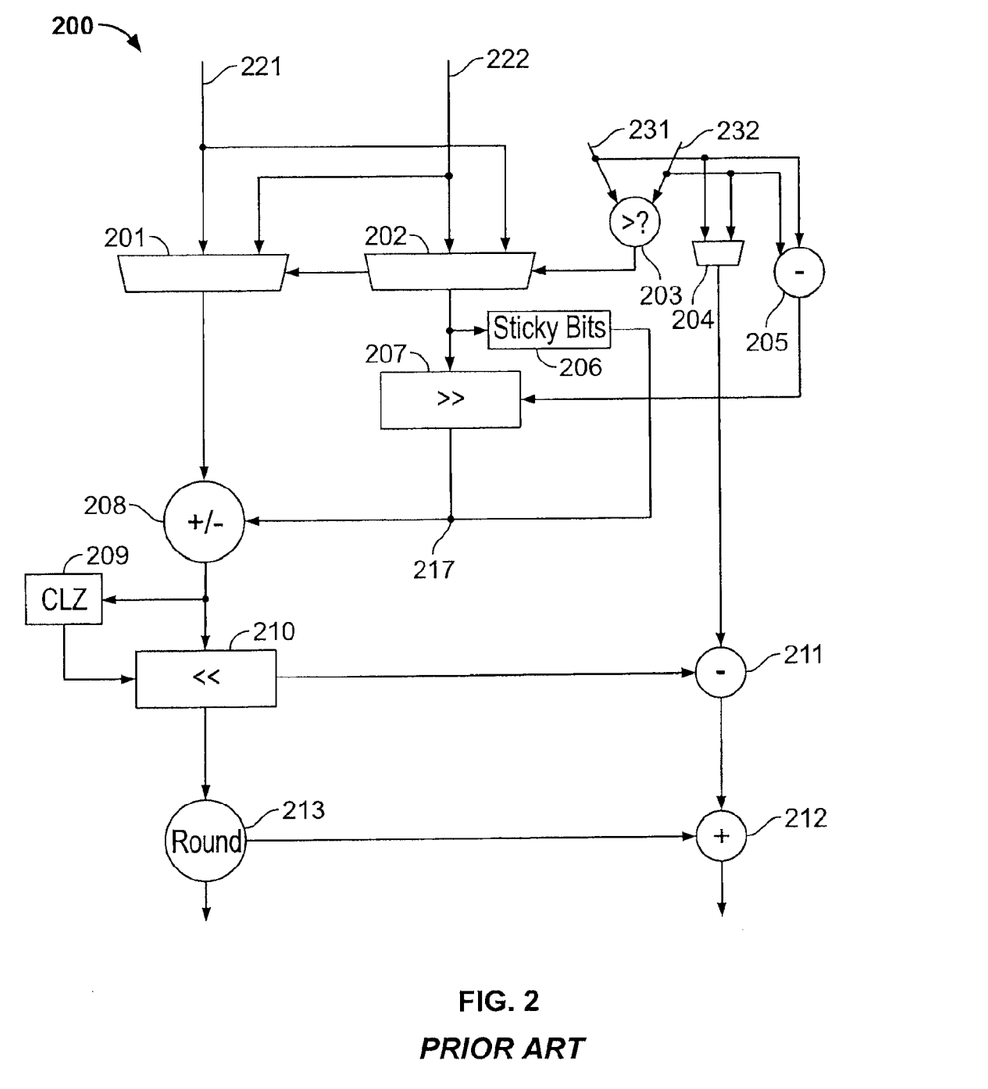
FIG. 2 shows the internal structure of a known adder that may be included in the block of FIG. 1.

In the adder 200 of FIG. 2, two mantissas 221, 222 are input to multiplexers 201 and 202. Their respective exponents 231, 232 are compared at 203, and the mantissa corresponding to the larger exponent is output from multiplexer 201 to the left datapath, while the mantissa corresponding to the smaller exponent is output from multiplexer 202 to the right datapath. The difference between the exponents is determined at 205. In the right datapath the smaller value is shifted to the right at 207 (this may include a shift of 0 bit positions) based on the difference at 205, and a sticky bit is calculated at 206—e.g., by ORing of all of the bits shifted to the right of the least significant bit (i.e., the 24th bit, including the implied position). The sticky bit is appended at 217 beyond the least significant bit of the shifted mantissa output of right shifter 207, and added to or subtracted from the left datapath at 208. The output of operator 208 may be negative, and at some point between the output of 208 and the output of the entire circuit, may be converted to a signed magnitude number. Alternatively, the circuitry could be designed so that the output of any fixed-point addition or subtraction is always positive.

The number of leading zeroes (or leading ones in cases in which the adder is designed to process negative numbers for a large portion of its internal calculations) is counted by count-leading-zero module 209 and the output of operator 208 is left-shifted at 210 so that a '1' is present at the leading '1' position that would have been implied. The following number of bits appropriate to the precision being implemented (23 bits in the single-precision case) become the unrounded mantissa bits, which are rounded at 213 using the bits below the least significant bit—i.e., bits following that number of bits. Any one of several known rounding types and techniques may be used. The exponent is incremented and decremented at 212 and 211, respectively, depending on the amount of shifting and rounding.

Figure 3:
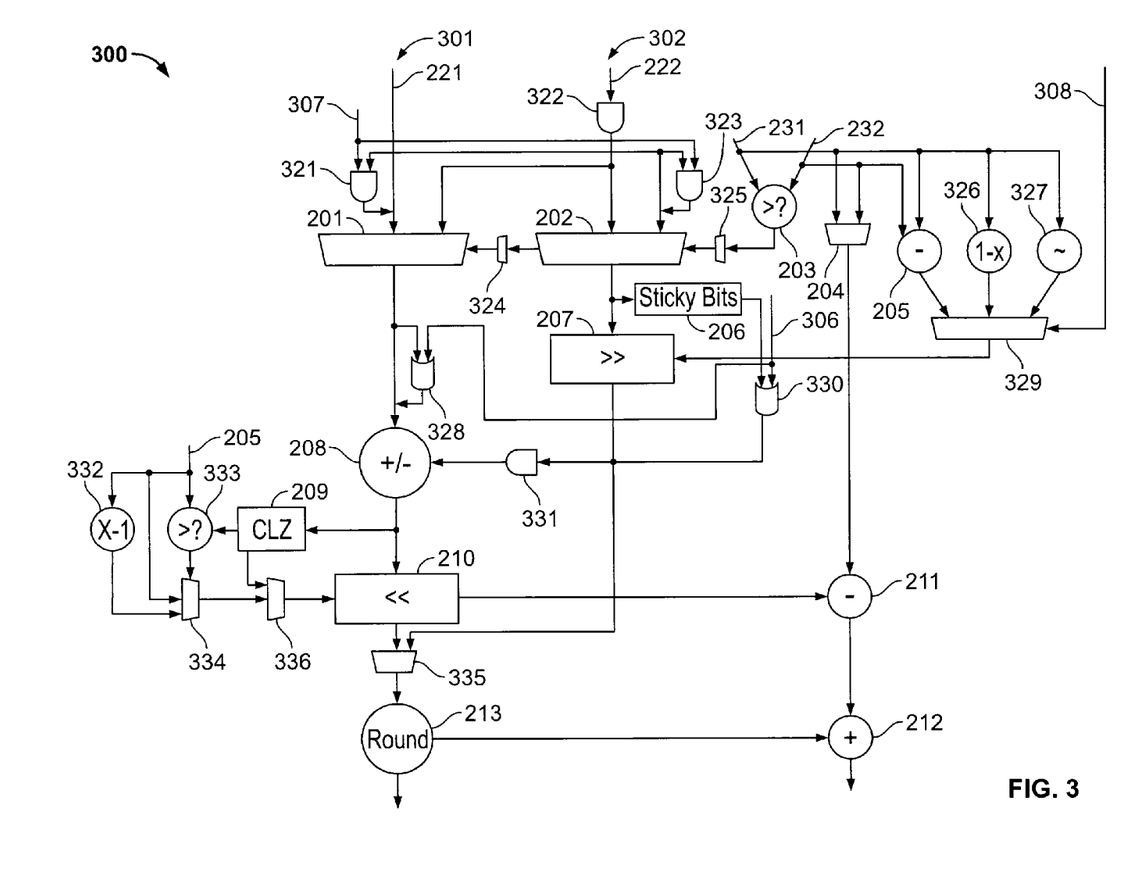
FIG. 3 shows the internal structure of an adder block similar to that of FIG. 2, but modified in accordance with embodiments of the invention.

As noted above, modifications can be made to adder structure 200 to allow support, inside the specialized processing block, of the additional variables, and the passing of information, described above, as needed for subnormal operation handling, so that the subnormal multiplication can be completed without resorting to the general purpose programmable logic outside the specialized processing block. Structure 300 of FIG. 3 is a modification of structure 200. Components of structure 300 that are substantially identical to corresponding components of FIG. 2 are identically numbered in FIG. 3 and will not be further discussed here except to the extent that they interact with components that are added in structure 300.

Structure 300 has two mantissa inputs 301, 302 and two exponent inputs 231, 232, as well as two different processing datapaths. In subnormal operations, only input 301 and exponent input 231 are used. The special subnormal variables generated by the multiplier control the datapath multiplexing. If the adder represented by structure 300 is used for subnormal support, AND-gate 331 keeps the two datapaths independent (the right datapath is used in Cases 1, 2 and 4, and the left datapath is used in Cases 3 (rounding only) and 5). Multiplexers 324 and 325 control which datapaths are selected by multiplexers 201, 202. AND-gates 321, 323 zero the implied leading '0' position if the input mantissa has an underflow flag associated with it, by ANDing the underflow flag 307 with that bit. AND-gate 322 is optional, and is used to save power when the right datapath is not used. The special_underflow_sticky flag 306 from the multiplier is optionally appended to the least significant bit of the left datapath at OR-gate 328 and to the sticky bits calculated at 206 at OR-gate 330.

The value 1−'exponent', used in Case 1 and Case 2, is calculated at 326. Similarly, the negative exponent (−'exponent') used in Case 4 is calculated at 327. The appropriate amount of right-shift is selected by multiplexer 329 from among 1−'exponent' 326, −'exponent' 327, and exponent difference 205, under control of the special negative exponent flag 308.

The amount of left-shift at 210, instead of simply being the leading-zero count 209 as in structure 200, is selected by multiplexer 334, based on the relative values of leading-zero count 209 and exponent difference 205 ('exponent'), from between the exponent difference 205 ('exponent') or 'exponent'−1 (as determined at 332). (See discussion of Case 5, above.) If the operation is not subnormal, either because the user has not configured the device of which structure 300 is a part to perform subnormal operations, or because signals from the multiplier based on Cases 1-5 above so indicate, then multiplexer 336 will select leading-zero count 209 directly; otherwise it will select the output of multiplexer 334.

Multiplexer 335 selects the appropriate datapath (right or left) to output. If the operation is not subnormal, either because the user has not configured the device of which structure 300 is a part to perform subnormal operations, or because signals from the multiplier based on Cases 1-5 above so indicate, or if the operation is subnormal and falls under Case 3 or 5, multiplexer 335 will select the left path. If the operation is subnormal and falls under Case 1, 2 or 4, multiplexer 335 will select the right path.

Figure 4:
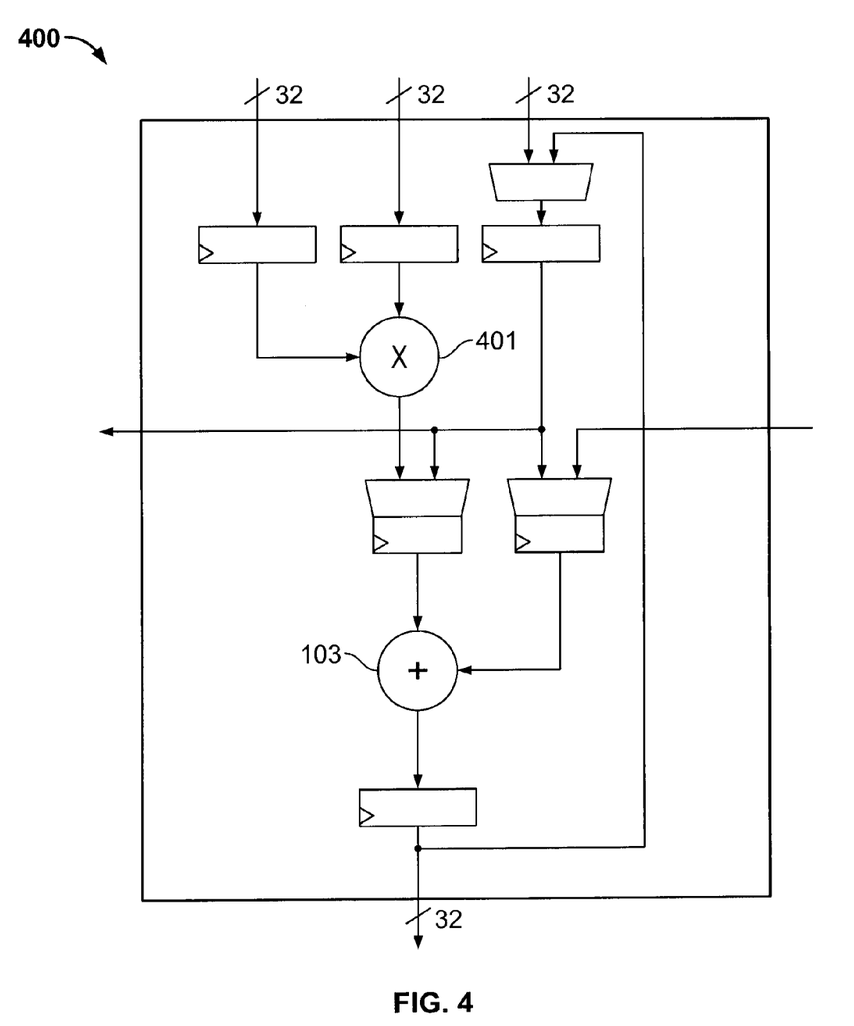
FIG. 4 shows another specialized processing block with which embodiments of the invention can be used.

Thus, when used in subnormal support mode, adder 103 of specialized processing block 100, as modified in accordance with FIG. 3, accepts the subnormal support signals or variables, and the results from multiplier 101 or 102, and completes the subnormal multiplication operation. The mantissa is output by rounding block 213, and the exponent is output by adder 212. As noted above, when not being used for subnormal support, adder 103 can be used as an adder as is well known. Moreover, although specialized processing block 100 includes two multipliers 101, 102, in some embodiments of the present invention, other types of specialized processing blocks may be used, as discussed above. For example, a specialized processing block may be implemented as shown in copending, commonly-assigned U.S. patent application Ser. No. 13/187,801, filed Jul. 21, 2011 and hereby incorporated by reference herein in its entirety. In such a specialized processing block 400, as shown in FIG. 4, the multiplier stage may include one multiplier 401 as shown, or two multipliers, along with adder 103 which can be used either as an adder or for subnormal operation support as above.

A PLD 90 incorporating specialized processing blocks according to the present invention, which support subnormal operations, may be used in many kinds of electronic devices. One possible use is in an exemplary data processing system 900 shown in FIG. 5. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 5:
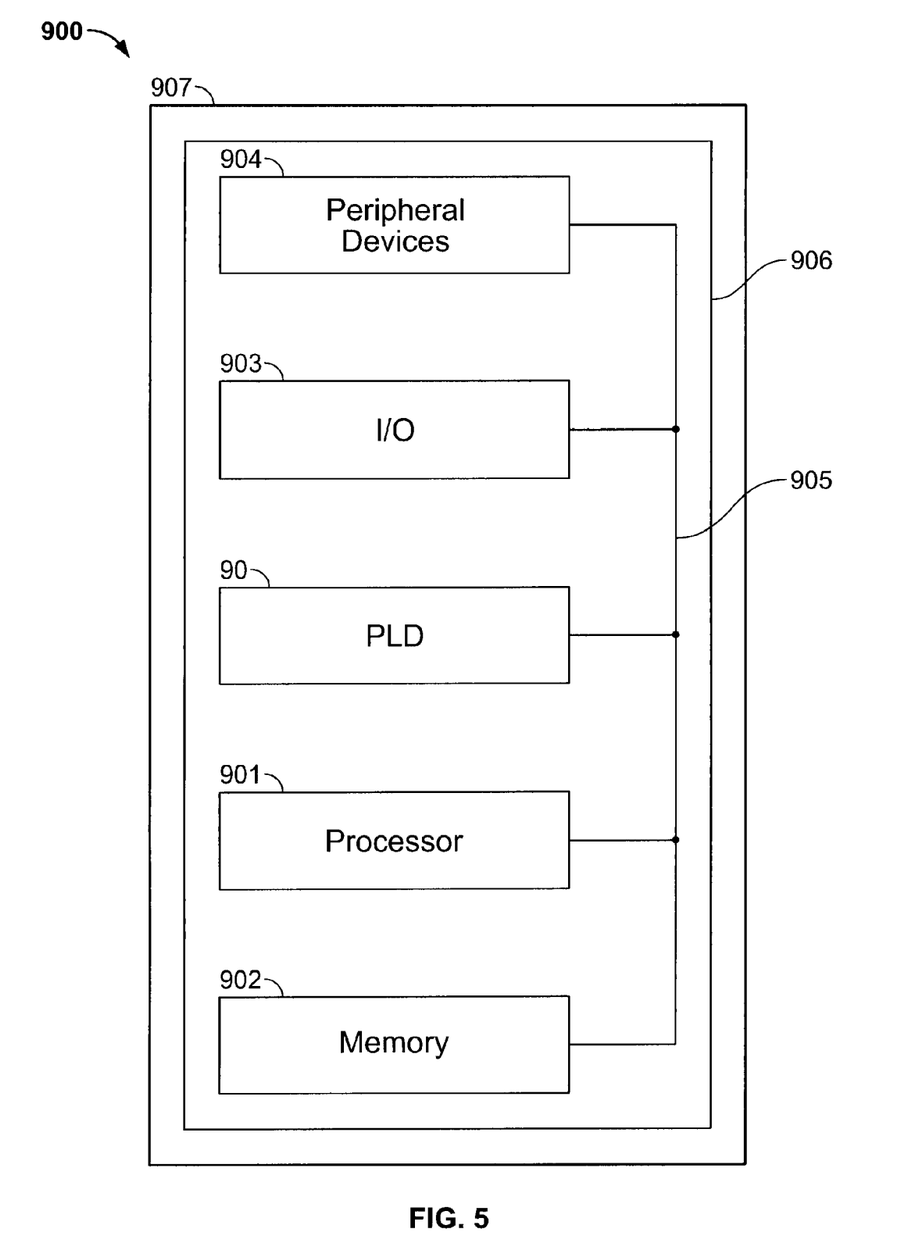
FIG. 5 is a simplified block diagram of an exemplary system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for operating on floating-point numbers, each of said floating-point numbers having a mantissa and an exponent, said circuitry comprising:
   at least one operator having an operator output including mantissa data and exponent data; and
   an adder having said operator output as an input, and including operating units that determine a plurality of functions of said exponent data; wherein:
   when an operation performed by said operator is a subnormal operation, said adder operates on said operator output to complete said subnormal operation based on said plurality of functions of said exponent data.

2. The circuitry of claim 1 wherein said operator is a multiplier.

3. The circuitry of claim 1 wherein said operator and said adder are included in a specialized processing block of a programmable integrated circuit device.

4. The circuitry of claim 1 wherein:
   said adder includes at least one left-shifter and at least one right-shifter; and
   when an operation performed by said operator is a subnormal operation, different ones of said plurality of functions of said exponent data determine an amount of right-shifting by said right shifter and an amount of left-shifting by said left shifter.

5. The circuitry of claim 4 wherein said plurality of functions of said exponent data include a difference between two exponents, a difference between '1' and an exponent, and a product of '−1' and an exponent.

6. The circuitry of claim 5 wherein said plurality of functions of said exponent data further include a difference between an exponent and '1' and a comparison between an exponent and a count of leading zeroes.

7. The circuitry of claim 1 further comprising gating for replacing an implied leading '1' in one of said floating point numbers with a leading '0' when an operation performed by said operator is a subnormal operation.

8. A method of using circuitry of a programmable integrated circuit device to operate on floating-point numbers, each of said floating-point numbers having a mantissa and an exponent, and said circuitry having at least one operator that has an output including mantissa data and exponent data, and having an adder; said method comprising:
configuring said adder to operate on said output of said operator, including configuring operating units in said adder to determine a plurality of functions of said exponent data; wherein:
operation of said adder on said output of said operator is configured so that when an operation performed by said operator is a subnormal operation, operation of said adder on said output of said operator completes said subnormal operation based on said plurality of functions of said exponent data.

9. The method of claim 8 further comprising:
when performing a normalized operation of said operator on said floating-point numbers, configuring said operator to operate on said numbers, and configuring said adder to add results from said operator to another adder input.

10. The method of claim 8 wherein:
said adder includes at least one left-shifter and at least one right-shifter; and
said configuring operation of said adder on said output of said operator to complete said subnormal operation comprises:
configuring different ones of said plurality of functions of said exponent data to determine an amount of right-shifting by said right shifter and an amount of left-shifting by said left shifter.

11. The method of claim 10 wherein said plurality of functions of said exponent data include a difference between two exponents, a difference between '1' and an exponent, and a product of '−1' and an exponent.

12. The method of claim 11 wherein said plurality of functions of said exponent data further include a difference between an exponent and '1' and a comparison between an exponent and a count of leading zeroes.

13. The method of claim 8 further comprising configuring gating of said specialized processing block to replace an implied leading '1' in one of said floating point numbers with a leading '0' when an operation performed by said operator is a subnormal operation.

14. A non-transitory machine readable data storage medium encoded with instructions for performing a method of using circuitry of a programmable integrated circuit device to operate on floating-point numbers, each of said floating-point numbers having a mantissa and an exponent, and said circuitry having at least one operator that has an output including mantissa data and exponent data, and having an adder; said instructions comprising:
instructions to configure said adder to operate on said output of said operator, including configuring operating units in said adder to determine a plurality of functions of said exponent data; wherein:
operation of said adder on said output of said operator is configured by said instructions so that when an operation performed by said operator is a subnormal operation, operation of said adder on said output of said operator completes said subnormal operation based on said plurality of functions of said exponent data.

15. The non-transitory machine readable data storage medium of claim 14 wherein said instructions further comprise instructions to, when performing a normalized operation on said floating-point numbers, configure said operator to operate on said numbers, and to configure said adder to add results from said operator to another adder input.

16. The non-transitory machine readable data storage medium of claim 14 wherein:
said operator output includes mantissa data and exponent data;
said adder includes at least one left-shifter and at least one right-shifter; and
said instructions that configure operation of said adder on said output of said operator configure different ones of said plurality of functions of said exponent data to determine an amount of right-shifting by said right shifter and an amount of left-shifting by said left shifter.

17. The non-transitory machine readable data storage medium of claim 16 wherein said plurality of functions of said exponent data include a difference between two exponents, a difference between '1' and an exponent, and a product of '−1' and an exponent.

18. The non-transitory machine readable data storage medium of claim 17 wherein said plurality of functions of said exponent data further include a difference between an exponent and '1' and a comparison between an exponent and a count of leading zeroes.

19. The non-transitory machine readable data storage medium of claim 17 further comprising instructions to configure gating of said specialized processing block to replace an implied leading '1' in one of said floating point numbers with a leading '0' when an operation performed by said operator is a subnormal operation.

\* \* \* \* \*